Patented Feb. 13, 1951

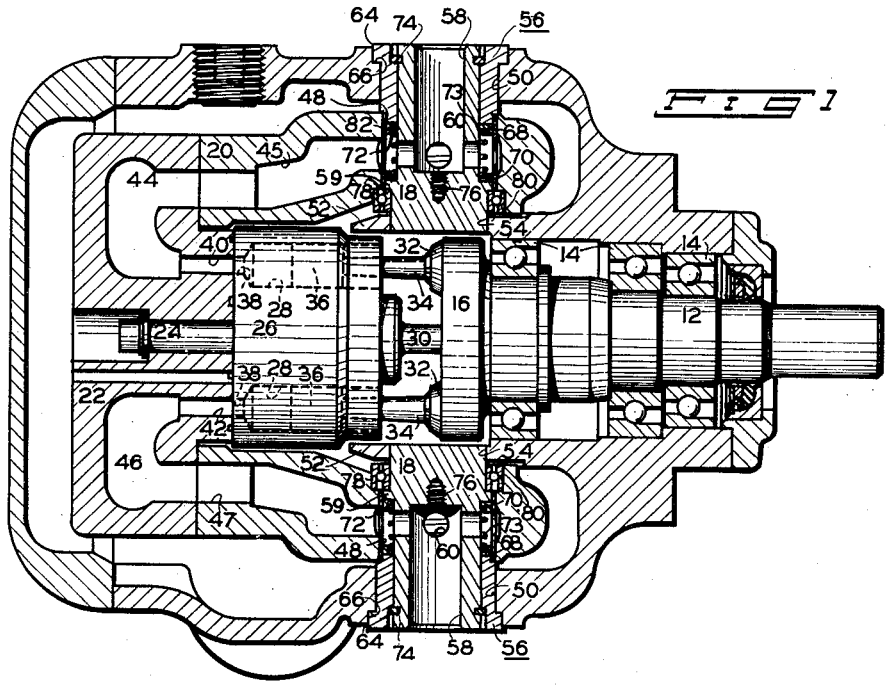

2,541,311

UNITED STATES PATENT OFFICE 2,541,311

SWIVEL PIPE JOINT

Harry F. Vickers and Wesley J. McLean, Detroit, Mich., assignors to Vickers Incorporated, Detroit, Mich., a corporation of Michigan Application January 11, 1946, Serial No. 640,654

3 Claims. (Cl. 285—96.3)

This invention relates to power transmissions, particularly to those of the type comprising two or more fluid pressure energy translating devices, one of which may function as a pump and another as a fluid motor.

The invention is particularly concerned with a form of pintle construction used with fluid pressure energy translating devices of the axial piston, variable displacement type to pivotally journal the arms of a swinging yoke within the casing member of the device.

In the past, it has been customary to pivotally journal the yoke arms within the casing member upon some stationary form of pintle construction connected to the casing member. It has also been customary to use inlet and outlet flanges in line with the pintle which, in some cases, serve the purpose of retaining the pintle within a bore of the casing member provided for mounting purposes. In many cases, if the yoke had to be removed from the casing member, although the inlet and outlet connection flanges were easily removable, the removal of the pintle construction in use proved to be cumbersome. In addition, the replacement of parts in the pintle assembly was difficult and, in some cases, because of slight wear of one portion of the pintle, a completely new pintle assembly had to be substituted.

It is, therefore, an object of this invention to provide for pumps and motors of the axial piston type having a two-armed swinging yoke for varying the displacement thereof, a pintle assembly for pivotally connecting the yoke arms within the casing member of such a construction as to be in cartridge form easily insertable and removable from the casing and once removed easily disassembled and reassembled.

It is also an object to provide an improved sealing means for the pintle joint which avoids the use of soft packing materials and in which all wearing surfaces are of metal.

Further objects and advantages of the present invention will be apparent from the following description, reference being had to the accompanying drawing wherein a preferred form of the present invention is clearly shown.

In the drawing:

Figure 1 is a longitudinal cross-sectional view of a fluid pressure energy translating device embodying a preferred form of the present invention.

Figure 2 is a sectional view of a preferred form of the present invention.

Referring now to Figure 1, the pump or motor illustrated comprises a casing 10 having a drive shaft 12 journalled on bearings 14 therein. The shaft 12 is provided with a driving flange 16 at its inner end.

Pivotally mounted on pintles 18 in the casing 10 is a two-armed yoke 20 the arms of which are hollow for fluid connection and suitably connected to the left-hand end of which is a valve block 22. Journalled on a stationary shaft 24 in the yoke 20 is a revolving cylinder barrel 26 having an odd number of cylinders 28 therein. The cylinder barrel 26 is connected for rotation from the shaft 12 by a Cardan shaft 30.

Flange 16 carries a plurality of ball sockets 32 in which are mounted ball-ended connecting rods 34 carrying pistons 36 reciprocable in the cylinders 28. Each of the cylinders 28 has a cylinder port 38 which, in the course of one revolution, registers first with an arcuate inlet port 40 in the valve block 22 and then with an arcuate discharge port 42 during the second half revolution. An inlet conduit 44 and a discharge conduit 46 located in the valve block and which are connected to inlet ports 40 and discharge port 42, respectively, register with passages 45 and 47, respectively, extending into the arms of yoke 20 and which intersect duplicate bores 48 formed in said arms. Bores 48 are adapted to register both for mounting and fluid flow purposes with bores 50 formed in the side walls of casing member 10. The casing member 10 is provided with two inwardly projecting tongues 52 having bores 54 in alignment with the bores 50.

Referring now to Figure 2, there is shown a unitary pintle cartridge assembly 56 by means of which yoke 20 is pivotally journalled within casing member 10. Cartridge assembly 56 contains the cylindrical pintle 18 which is provided with a bore 58 closed at the end adapted to face the interior of the casing and open at the end adapted to register with either inlet or outlet flange connections, not shown. Pintle 18 is also provided with a flattened flange 59 and a plurality of ports 60 which intersect bore 58.

A sleeve 62 surrounds a portion of pintle 18, extending from the open end of the bore 58 to a point short of ports 60. Sleeve 62 is provided with a flange 64 adapted to abut a shoulder 66 formed in the walls of bore 50 of casing member 10. Suitable duplicate metallic sealing rings 68 and 70 preferably constructed of bronze are located on the pintle above and below ports 60 and are resiliently urged against flattened flange 59 of pintle 18 and a flattened end surface 72 of sleeve 62 by means of a spring 73. Pintle 18 is connected to sleeve 62 by means of a split ring 74.

Thus, it can be clearly seen that to assemble the cartridge 56 it is a simple matter to place on the pintle the two sealing rings 68 and 70 separated by the spring 73, to shift sleeve 62 on pintle 18 so that an abutment is formed between the sealing rings 68 and 70 and the flattened surfaces of flange 59 and sleeve 62 and then insert split ring 74. Ring 74 will prevent outward movement of sleeve 62 relative to pintle 18 while spring 73 will not only retain the sealing rings 68 and 70 in abutment against flattened surfaces 59 and 72 but will maintain sleeve 62 in contact with ring 74.

A suitable jack screw may be inserted in a threaded extension 76 of bore 58 for removing the cartridge assembly. The cartridge may then be easily disassembled by exerting a slight force on the flange 64 of the sleeve 62 and removing the split ring 74. Once the ring 74 is removed, the pintle 18 may be easily removed from the sleeve 62 and the sealing rings 68 and 70 and springs 73 slipped off of pintle 18.

Referring now to Figure 1, suitable duplicate bearings 78 are located in duplicate stepped portions 80 of the yoke arm bores 48 to furnish proper pivotal bearing movement of yoke 20 relative to pintle 18. A liner 82 may be fitted into bore 48 of yoke 20 to insure that dissimilar metals are associated at all rubbing surfaces of the device. When mounting the yoke 20 within casing member 10, duplicate cartridge assemblies 56 are inserted in yoke bore 48 and casing bore 50 so that sleeve 62 abuts the wall of casing bore 50 and so that ports 60 register with the inlet and discharge conduits 45 and 47. The portion of cartridge 56 containing sealing rings 68 and 70 and flange 59, with the cooperation of yoke arm bores 48, serve as journals for the yoke arms. It can be clearly seen that if inlet and outlet connection flanges, not shown, are mounted on casing 10 abutting pintle 18 and sleeve 62 and so as to register with the bore 50 of casing member 10, the complete cartridge assembly 56 will be held securely in place within casing member 10 and fluid may enter and discharge from the device by means of the cooperation of the cartridge and the flange connections.

The operation of the device illustrated in Figure 1 is well known to the art. The present invention is concerned only with providing a means of simple and reliable construction for pivotally journalling the yoke within the casing member and this is successfully performed by the use of the pintle cartridge hereinbefore described.

The sealing rings 68 and 70 are fitted closely to the bore of liner 82 on their outside cylindrical surfaces so as to prevent any significant leakage at this point. The flat ends of the rings are also fitted accurately against the shoulders 59 and 72 and the spring engagement therewith serves to maintain a good seal at this point.

While the form of embodiment of the invention as herein disclosed constitutes a preferred form, it is to be understood that other forms might be adopted, all coming within the scope of the claims which follow.

What is claimed is as follows:

1. A unitary pump pintle sub-assembly comprising in combination, a first sleeve member having a bore therein closed at its inner end and communicating by radial passage means with the outside surface of the sleeve, a second sleeve telescoped over the first sleeve, means forming oppositely facing shoulders, one on each sleeve, and at either side of said radial passage means, a pair of ring seals associated with said shoulders, a split ring retainer for limiting outward movement of the outer sleeve relative to the inner sleeve, and a spring positioned between said ring seals and serving both to maintain the seals in contact with their respective shoulders and to maintain the outer sleeve in contact with the split ring.

2. A unitary pump pintle sub-assembly comprising in combination a cylindrical pintle having a flange, a bore and radial passage means extending from the bore to the outside surface of the pintle, a sleeve surrounding a portion of the pintle and one end of which forms a shoulder, said pintle flange and sleeve shoulder being located on opposite sides of the radial passage means, a pair of sealing rings surrounding the pintle, one on each side of the radial passage means, a split ring retainer for limiting outward movement of the sleeve relative to the pintle, and a spring positioned between said sealing rings and serving to maintain one seal in engagement with the shoulder, the other seal in engagement with the flange and to maintain the sleeve in contact with the split ring.

3. A unitary pump pintle sub-assembly comprising in combination a cylindrical pintle having a flattened flange, a bore and radial passage means extending from the bore to the outside surface of the pintle, a sleeve surrounding a portion of the pintle and having a flattened end surface forming a shoulder, said pintle flange and sleeve shoulder being located on opposite sides of the radial passage means, a pair of metallic flattened sealing rings surrounding the pintle, one on each side of the radial passage means, a split ring retainer for limiting outward movement of the sleeve relative to the pintle, and a spring positioned between said sealing rings and serving to maintain one seal in engagement with the shoulder, the other seal in engagement with the flange and to maintain the sleeve in contact with the split ring.

HARRY F. VICKERS.
WESLEY J. McLEAN.

REFERENCES CITED

The following references are of record in the file of this patent:

UNITED STATES PATENTS

| Number | Name | Date |
|---|---|---|
| 2,270,927 | Browne | Jan. 27, 1942 |
| 2,277,570 | Vickers | Mar. 24, 1942 |
| 2,288,768 | Zimmerman | July 7, 1942 |
| 2,307,328 | Martin | Jan. 5, 1943 |
| 2,313,407 | Vickers | Mar. 9, 1943 |
| 2,423,069 | McElhose et al. | June 24, 1947 |
| 2,481,404 | Donner | Sept. 6, 1949 |